(12) United States Patent
Lindholm et al.

(10) Patent No.: US 10,118,563 B2
(45) Date of Patent: Nov. 6, 2018

(54) TENSIONING DEVICE FOR A BICYCLE SUPPORT ASSEMBLY OR A LOAD CARRIER

(71) Applicant: Thule Sweden AB, Hillerstorp (SE)

(72) Inventors: Olof Lindholm, Värnamo (SE);
Morgan Lindell, Värnamo (SE);
Andreas Arvidsson, Sävsjö (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/305,053

(22) PCT Filed: Apr. 21, 2015

(86) PCT No.: PCT/EP2015/058585
§ 371 (c)(1),
(2) Date: Oct. 18, 2016

(87) PCT Pub. No.: WO2015/162123
PCT Pub. Date: Oct. 29, 2015

(65) Prior Publication Data
US 2017/0174143 A1 Jun. 22, 2017

(30) Foreign Application Priority Data
Apr. 22, 2014 (EP) .................................... 14165400

(51) Int. Cl.
*B60R 9/00* (2006.01)
*B60R 9/048* (2006.01)
(Continued)

(52) U.S. Cl.
CPC ................ *B60R 9/048* (2013.01); *B60R 9/10* (2013.01); *F16D 7/024* (2013.01); *F16H 19/0672* (2013.01); *F16H 31/001* (2013.01)

(58) Field of Classification Search
CPC . B60R 9/048; B60R 9/10; F16D 7/024; F16H 19/0672; F16H 31/001
(Continued)

(56) References Cited

FOREIGN PATENT DOCUMENTS

DE 20 2006 01780 1/2007
EP 2 230 412 9/2010
(Continued)

OTHER PUBLICATIONS

International Search Report and Written Opinion of the International Searching Authority for International Appl. No. PCT/EP2015/058585, European Patent Office, Berlin, Germany, dated Sep. 24, 2015, 13 pages.

*Primary Examiner* — Peter Helvey
(74) *Attorney, Agent, or Firm* — Sterne, Kessler, Goldstein & Fox P.L.L.C.

(57) ABSTRACT

A tensioning device for a load carrier, such as a bike carrier or a roof box. The tensioning device includes a torque limiting mechanism which is adapted to limit the amount of transferable torque. The torque limiting mechanism includes a first torque transmission member and a second torque transmission member. The first torque transmission member is biased into working cooperation with the second torque transmission member such that upon a torque threshold value, the first and second torque transmission members are disengaged from working cooperation so that a torque limiting function is provided. An activation member is associated with the first torque transmission member, which enables a user to operate the first torque transmission member to transfer torque to the second torque transmission member.

25 Claims, 12 Drawing Sheets

(51) Int. Cl.
*B60R 9/10* (2006.01)
*F16D 7/02* (2006.01)
*F16H 19/06* (2006.01)
*F16H 31/00* (2006.01)

(58) Field of Classification Search
USPC .......................................................... 224/324
See application file for complete search history.

(56) References Cited

FOREIGN PATENT DOCUMENTS

| | | |
|---|---|---|
| FR | 2 841 195 | 12/2003 |
| WO | WO 03/106221 | 12/2003 |
| WO | WO 2008/145496 | 12/2008 |
| WO | WO 2009/065817 | 5/2009 |
| WO | WO 2013/165640 | 11/2013 |

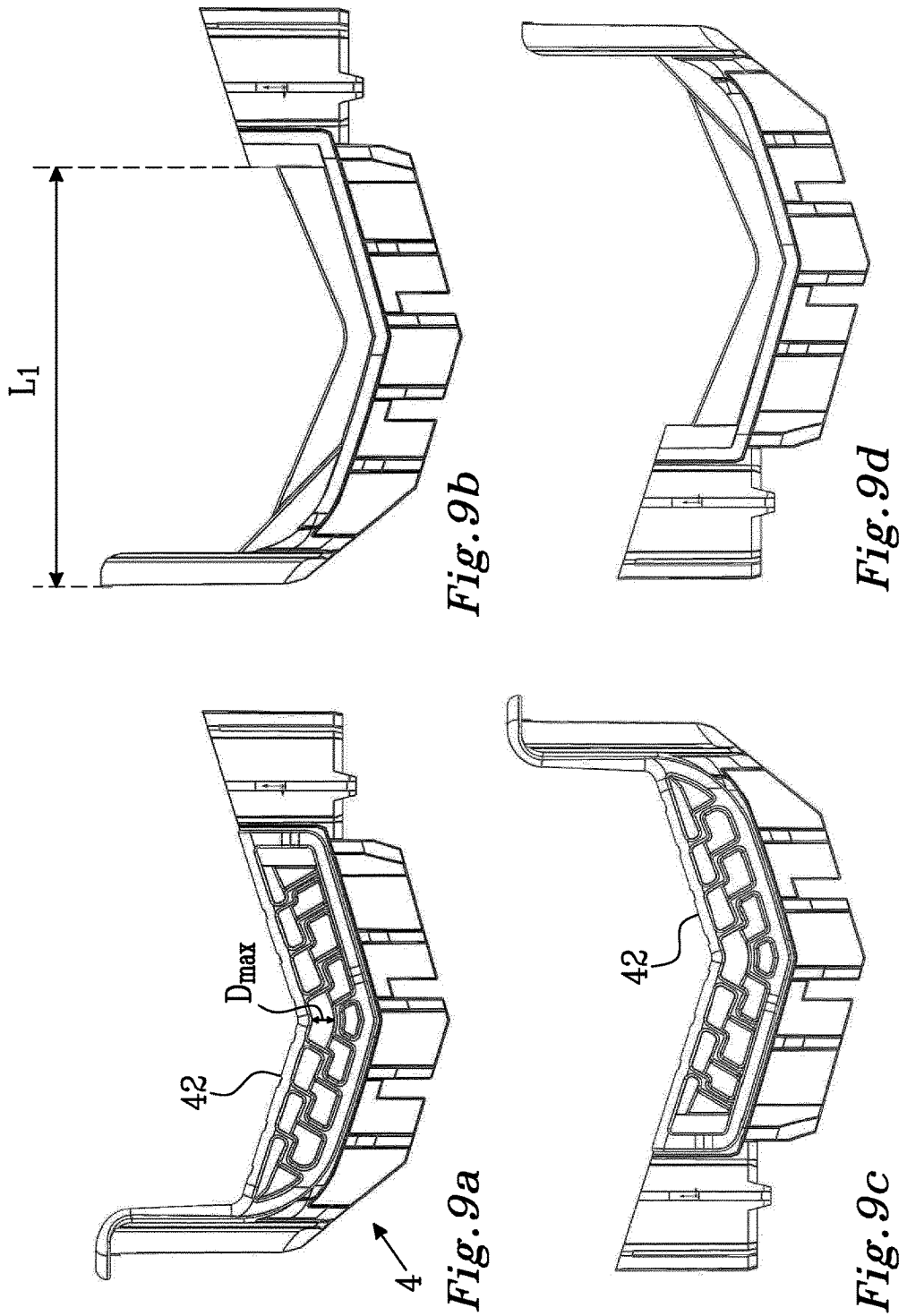

TENSIONING DEVICE FOR A BICYCLE SUPPORT ASSEMBLY OR A LOAD CARRIER

TECHNICAL FIELD

The present disclosure relates to a tensioning device having a torque limiting mechanism which is specifically adapted to remotely control a load retaining mechanism, it further relates to a bicycle support assembly comprising the tensioning device, and a load carrier, such as a bicycle carrier comprising the tensioning device.

BACKGROUND OF THE INVENTION

Load carriers, such as bicycle carriers, for vehicles are widely used to provide the vehicles, such as automobiles, with an increased loading capacity. A bicycle carrier is usually mounted on the vehicles tow hook, an equivalent position at the rear of the vehicle, or on roof racks. Wherever the bicycle carrier is mounted, there is a need to readily secure the bicycle to the bicycle carrier especially before transportation of the bicycle in traffic environments. A bicycle which is accidentally detached from the bicycle carrier during transportation could cause a severe accident with another vehicle.

Bicycle support assemblies for securing a bicycle to a bicycle carrier are widely used together with bicycle carriers for vehicles. It is common that bicycle support assemblies use a clamping jaw to secure the bicycle to the bicycle support assembly. One such bicycle support assembly is disclosed in the International patent application no. WO 2009/065817 Thule Sweden AB. The clamping jaw of the bicycle support assembly comprises a first and a second jaw member which upon tightening with a tightening device, such as a rotating knob, are pressed together about a portion of a bicycle, usually the frame of the bicycle, to secure the bicycle to the bicycle carrier.

It has now been found that clamping jaws of the aforementioned kind have some disadvantages, especially when remotely operated using a wire mechanism. The wire of such wire mechanism generally tends to run inside of a support bar. It has been found that there is a severe risk that the wire is subjected to unnecessary high friction forces which requires the wire to have a high tear and wear allowance. This is costly and limits how the wire can extend especially for bicycle support assemblies. There is also a need for compact and space saving torque limiting mechanism.

SUMMARY

It is an object of the present disclosure to remove the drawback or partly reduce the drawback, or to provide for a useful alternative to the prior art. The object is at least partly met by a tensioning device for a load carrier, such as a bike carrier or a roof box, the tensioning device comprises a torque limiting mechanism adapted to limit the amount of transferable torque. The torque limiting mechanism comprises a first and a second torque transmission member, the first torque transmission member is biased into working cooperation with the second torque transmission member wherein upon a torque threshold value, the first and second torque transmission members are disengaged from the working cooperation so that a torque limiting function is provided. An activation member is associated with the first torque transmission member enabling a user to operate the first torque transmission member to transfer torque to the second torque transmission member. The second torque transmission member has a rotation axis and is connected to an elongated element, wherein upon rotation of the second torque transmission member, the elongated element is displaced in a direction offset to the rotation axis.

The elongated element can be a flexible elongated element such as a wire, cord, strap, chain or the like, or a rigid elongated element such as rod e.g. steel or aluminium rod.

The tensioning device reduces the wear and tear of the elongated element, especially for a flexible elongated element, by securing that the amount of transferable torque is limited to a predetermined threshold value. This enables a better prediction of the amount of wear and tear which the elongated element is subjected to. It enables the elongated element to run in a load carrier or a bicycle support assembly, along a path which could otherwise be restricted due to sharp edges, tight turns or similar features, which could affect the wear and tear of the elongated element in a negative manner. Hence the configuration and design of a load carrier or a bicycle support assembly do not need to rely on these considerations. The elongated element can be flexible elongated element such a wire, a cord, a strap, a chain or the like.

The second torque transmission member can be associated with a flexible elongated element, such as a wire, which upon rotation of said second torque transmission member is tensioned.

The flexible elongated element can be wound or unwound about an axle, having a rotation axis, upon rotation of the second torque transmission member. Winding the flexible elongated element about an axle provides a compact and space consuming arrangement.

The first and the second torque transmission members can be a first and a second gear. Using gears has been found to be a reliable and sturdy construction for a torque limiting mechanism. The gears can be of a crown gear or contrate gear type in the sense that the teeth projects at right angles to the plane of the wheel. The gears can also be of bevel gear type, i.e. the rotation axes of the gears intersects with each other, e.g. the first rotation axis of the first gear can be substantially perpendicular to the rotation axis of the second gear. The gears can also be of spur gear type and have the rotation axes parallel but not aligned with each other. In the latter case the gear teeth extends in a radial direction. As an option to gears, gear type or gear like devices using gear teeth portions can be used to facilitate the torque limiting mechanism. It is also possible to have friction surfaces cooperating to provide for the torque limiting mechanism.

The first torque transmission member can be biased towards the second torque transmission member, advantageously in a direction parallel, advantageously aligned, with the rotation axis into the working cooperation. The first torque transmission member and the second torque transmission member can each have a rotation axis which is aligned with each other. The first torque transmission member can be biased towards the second torque transmission member using a resilient member such as a rubber member, a member having rubber like properties, or a spring. The spring can be a helical spring, leaf spring or any other suitable spring.

The first torque transmission member can optionally be biased towards the second torque transmission member in a direction substantially perpendicular to the rotation axis. The first torque transmission member can be concentrically positioned with respect to the second torque transmission member. The first torque transmission member can be in the form of a ring having gear teeth arranged on the inside and the second torque transmission member can be positioned inside the first torque transmission member and adapted to rotate about the same rotation axis as the first torque transmission member. A portion of the second torque transmission member can be biased radially into engagement with the first torque transmission member.

The second torque transmission member can comprise the axle, rotatable about the rotation axis, enabling the flexible elongated element to be wound or unwound about the axle. The axle can be formed in one unitary piece of material with the second torque transmission member, or by a separate piece of material with respect to the second torque transmission member. In cases were the axle is formed by a separate piece of material, the axle can still be connected to the second torque transmission member so that any rotation of the second torque transmission member is directly transferred to the axle.

The rotation axis of the axle is advantageously aligned with the rotation axis, or pivot axis, of the second torque transmission member and/or the first torque transmission member.

The flexible elongated element can comprise a first and a second end, wherein the first end is attached to the second torque transmission member. It enables the flexible elongated element to be readily wound and unwound about the axle if desired. Connecting the flexible elongated element to the second torque transmission member provides for a secure torque limiting mechanism to the tensioning device. The first end of the flexible elongated element can be connected to the second torque transmission member in the proximity of the axle if the axle is connected or formed by the second torque transmission member. The first end of the elongated element e.g. a rigid elongated element or a flexible elongated element could optionally be connected to the second torque transmission member at the periphery of the second torque transmission member. The second torque transmission member can be provided with a protruding portion extending from the periphery of the second torque transmission member and to which the elongated element can be connected.

The axle has a proximal end and a distal end with respect to the second torque transmission member. The first end of the flexible elongated element is advantageously arranged in the proximity of the proximal end of the axle. Optionally the first end of the flexible elongated element can be attached to the axle itself, advantageously in the proximity of the proximal end of the axle.

The second end of the elongated element can be connected to a load retaining mechanism, such as a clamping member, a jaw member or the like, or a lock, such as a lock to a lid for a roof box. This enables e.g. the load retaining mechanism to be remotely controlled via the elongated element and thus provide a torque limiting mechanism to the remotely positioned load retaining mechanism.

It can sometimes be important to increase the length the elongated element is tightened, or to reduce the length which the elongated element is tightened. One case in which it may be advantageous to increase the length which the flexible elongated element is tightened is when it is associated, or connected to, a clamping jaw having a wide mouth. A clamping jaw with a wide mouth, or large opening, may require that the flexible elongated element is tightened a larger distance to readily close about a frame of a bicycle. To solve this, the second torque transmission member can be associated with a third gear, enabling a changed gear ratio between the second torque transmission member and the axle. The gear ratio can be above 1 or below 1 dependent of whether the gear change needs to be increased or reduced.

The third gear can be directly engaging the second torque transmission member and the axle. Optionally, the axle itself can be provided with a gear and optionally form the third gear.

The activation member can be adapted for manual operation of the first torque transmission member such as a rotatable knob or a lever such as a pivotable lever, or an electric switch adapted for automatic operation of the first torque transmission member. This can be enabled by using an electric motor to rotate the first torque transmission member.

The tensioning device can comprise a rotation lock. The rotation lock is configured to prevent the second torque transmission member and/or the axle from rotation. The purpose is to maintain the imparted torque to the elongated element and thus secure e.g. a bike to a clamping jaw.

The tensioning device can be arranged on a bicycle support assembly. Bicycle support assemblies are advantageously used on bicycle carriers. An aspect of the present invention thus relates to a bicycle support assembly comprising at least one tensioning device and a bicycle carrier comprising at least one bicycle support assembly. The bicycle support assembly can comprise the tensioning device according to any one of the preceding claims and a support bar. The elongated element can extend inside or outside of the support bar. The elongated element, such as a wire, is connected to a load retaining mechanism. The load retaining mechanism is advantageously a clamping jaw. The tensioning device is adapted to tension the load retaining mechanism via the elongated element. This reduces the risk of damaging the bike if a bike is retained by the clamping jaw. It further reduces the risk of impart unnecessary wear and tear to the individual components and especially the elongated element, such as a wire, which is subjected to a lot of wear and tear if it extends inside, or along, a support bar.

The tensioning device described herein, or according to any one of the appended claims, can be arranged on a load carrier. The load carrier is adapted to be attached to a vehicle e.g. at the rear or on the roof. It may be used to attach load to the load carrier or to lock the lid of a roof box for example. If the load carrier is a bicycle carrier comprising a wheel tray adapted to receive a wheel of a bicycle, the tensioning device can be arranged on said wheel tray.

The elongated element can be a flexible elongated element or a rigid elongated element. It should be noted that the term "wound" or "unwound" does not mean that a flexible elongated element needs to be wound a full revolution about the axle; a flexible elongated element is considered wound about an axle even if only partly wound about an axle. The term "fully wound" or "fully unwound" means that the flexible elongated element must be wound or unwound at least a full revolution about the axle. This is an option for the described non-limiting embodiments disclosed herein.

According to one aspect of the invention, a bicycle support assembly according to claim 16 is provided. Further embodiments are set out in the dependent claims. A bicycle support assembly for retaining a bicycle in a bicycle carrier arrangement on a transporting vehicle is provided. The bicycle support assembly comprises an elongated supporting arm extending in a longitudinal direction of the bicycle support assembly. The bicycle support assembly comprises a clamping jaw arranged substantially at an outer end of the supporting arm. The clamping jaw comprises a first jaw member comprising a first bicycle facing surface and is connected to the supporting arm. A second jaw member comprises a second bicycle facing surface. The second bicycle facing surface faces the first bicycle facing surface.

At least one of the first and second jaw members is movable with respect to the supporting arm such that a clamping force can be provided there between to retain the bicycle between the first and the second jaw members.

The first bicycle facing side of the first jaw member has a length and a width, and in that the first bicycle facing surface of the first jaw member comprises a first ridge protrudes from the first bicycle facing surface of the first jaw member. The first ridge extends along the length of the first bicycle facing surface of the first jaw member. The first ridge has a width, the width of the first ridge is smaller than the width of the first bicycle facing surface of the first jaw member.

By having a ridge which extends along the length of the jaw member, a smaller contact point is provided towards the frame of the bicycle, i.e. a smaller contact point which imparts the frame of the bicycle with the major portion of the clamping force. The ridge thus extends substantially perpendicular to the longitudinal axis of the frame after the frame has been mounted to the clamping jaw. It has been found that the bicycle, and especially the frame of the bicycle is clamped in a very forgiving manner by the use of such ridge, as the clamping jaw becomes less susceptible for misalignment of the clamping jaw.

The second bicycle facing side has a length and a width, and the second bicycle facing surface of the second jaw member comprises a second ridge protruding from the second bicycle facing surface of the second jaw member. Each jaw member can thus be provided with a ridge. The second ridge extends along the length of the second bicycle facing surface of the second jaw member wherein the second ridge has a width. The width of the second ridge is smaller than the width of the second bicycle facing surface of second first jaw member. The width of the jaw member and the ridge should be measure at a corresponding location, i.e. vertically separated measuring points but in the same plane.

The first and/or the second jaw member maybe provided with a bicycle protecting element arranged on the bicycle facing side of the respective jaw member. Such bicycle protective element could be a resilient pad for example. The resilient pad can be compressed by will regain, or at least substantially regain, its original form after compression is released. A resilient pad provides a lenient material which can be directly adjacent the bicycle and also distributes the force from the clamping jaw to a larger area on the bicycle than what would otherwise be the case without a resilient pad.

The first and/or the second ridge may advantageously be provided with a resilient pad. The resilient pad having a maximum deformation distance and a zero deformation distance. The zero deformation distance is defined by the resilient pad when the resilient pad is in its relaxed state, i.e. not subjected to a compression force or similar. The resilient pad may be arranged to fully cover the ridge of the jaw member, or be arranged to at least cover the bicycle facing surface of the ridge, or the upper portion, of the ridge. The maximum deformation distance is reached by deforming the resilient pad by a preselected force, preferably corresponding to 7 Nm. The preselected force should be selected so that the resilient pad just reaches its maximum deformation distance, or almost reaches its maximum deformation distance. In this manner, the resiliency of the resilient pad is still used. However, it has been found that the deformation of the resilient pad should be at so that 50% of the maximum deformation distance is reached, as otherwise there is a risk that the clamping jaw is not clamping about the bicycle, or more accurately the frame of the bicycle hard enough to retain it in a stable manner.

The first and/or the second resilient pad has a width, the width of the first and/or the second resilient pad may be larger than the width of the first and/or the second ridge respectively, or preferably equal to or smaller than the respective width of the first and/or the second bicycle facing side of the first and/or the second jaw member.

The resilient pad is made from at least one material selected from the list of; polyethylene, polypropylene, polyureathane or combinations thereof.

The bicycle support assembly may be operated via a tensioning device. The tensioning device preferably comprises a torque limiting mechanism adapted to limit the amount of transferable torque. The limit of transferable torque is preferably substantially corresponding to 7 Nm, or is optionally selected so that the resilient pad just reaches its maximum deformation distance when being compressed. The limit of transferable torque of the torque limiting mechanism and the corresponding preselected force may thus be selected to substantially correspond to the preselected force of the resilient pad.

BRIEF DESCRIPTION OF THE DRAWINGS

Non-limiting embodiments will be described in greater detail with reference to the accompanying figures in which;

FIG. 1 shows a bicycle support assembly for a bicycle carrier adapted to the connected to a roof rack, a bicycle carrier or the like;

FIGS. 9*a*-9*f* show different views of the first jaw member of the clamping jaw of FIG. 7 and;

DETAILED DESCRIPTION OF PREFERRED EMBODIMENTS

Figure 1:
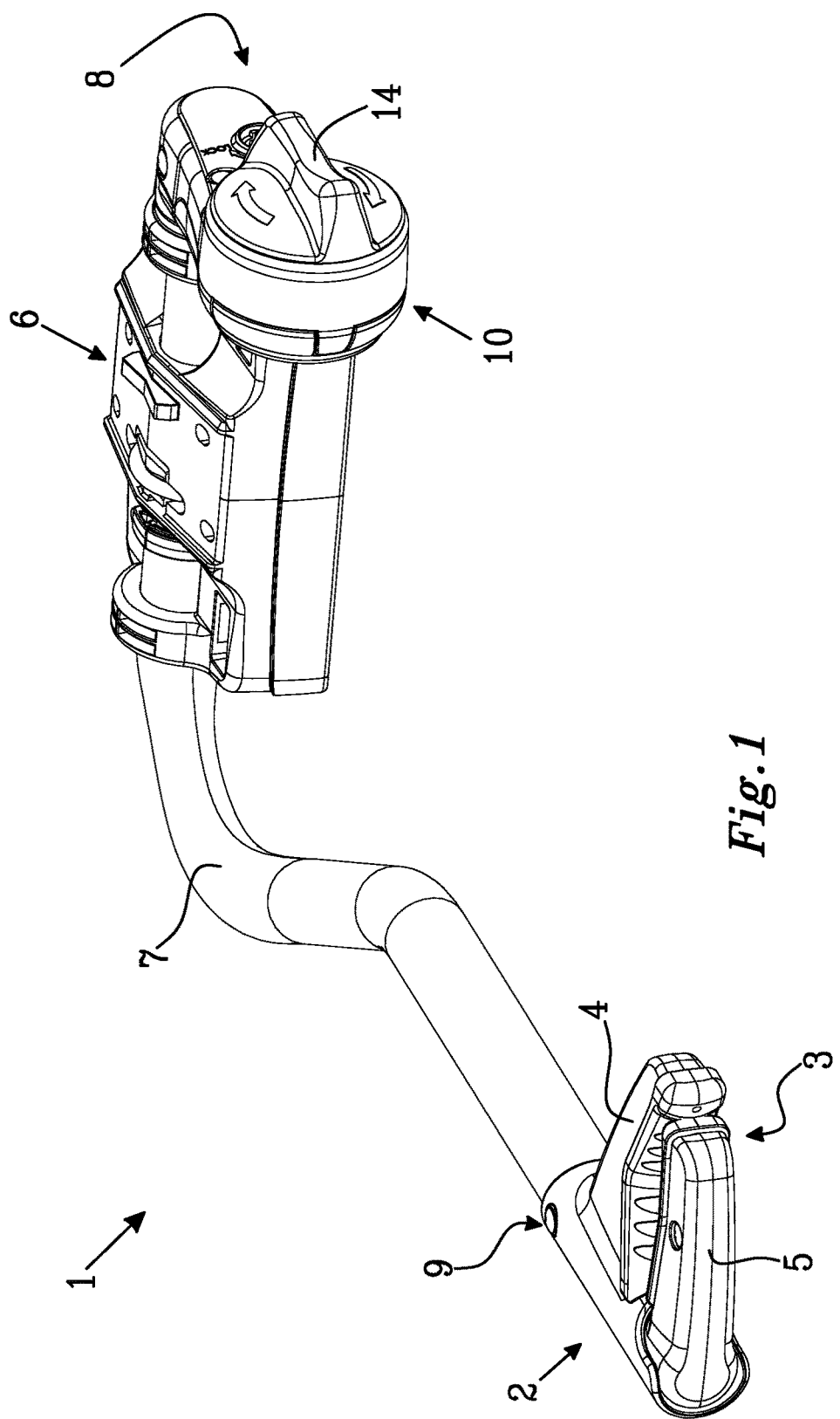

FIG. 1 shows a bicycle support assembly 1 which is connectable to a load carrier for a vehicle, preferably a bicycle carrier. The bicycle carrier can be a roof mountable bicycle carrier or a vehicle rear mountable bicycle carrier such as a towing hook mountable bicycle carrier. The bicycle support assembly is intended to retain a bicycle to the load carrier by being attachable to the frame of the bicycle, in this shown embodiment by a load retaining mechanism 2 in the form of a clamping jaw 3 having a first and a second jaw member 4, 5. The clamping jaw 3 is operable via a tensioning device 10. The bicycle support assembly 1 is attached to the load carrier via an attachment module 6, which can be adapted dependent on the type of load carrier which the bicycle support assembly is intended to be connected to.

The tensioning device comprises a rotatable knob 14, which in general terms is referred to as an activation member. The activation member is used to active the tensioning device in terms of that a user may operate it to tension the clamping jaw 3, to retain a bicycle to the bicycle support assembly 1. Upon operating the tensioning device 10, the distance between the first and the second jaw members 4, 5 is decreased until the bicycle is readily retained thereto. The second jaw member 5 is displaced towards the first jaw member 4 which position is fixed. A resilient member (not shown) in the form of a helical spring, biases the second jaw member 5 away from the first jaw member 4.

The tensioning device 10 operates the clamping jaw 3 via an elongated element preferably a flexible elongated element (not shown in FIG. 1). The flexible elongated element can be a wire, a cord, a strap, a chain or the like. A support bar 7, which is pivotable with respect to the attachment module 6, separates the clamping jaw 3 and the tensioning device 10 and enables the positioning of the clamping jaw 3 to a desired position remote from the tensioning device 10. The support bar 7 has a first and a second end 8, 9 wherein the first end 8 is connected to the tensioning device 10 and the second end 9 is connected to the clamping jaw 3. The attachment module 6 is positioned between the first ends 8, 9 although in the shown embodiment close to the first end 8 of the support bar 7. The tensioning device 10 is as mentioned connected to the support bar 7 and is enabled to pivot with the support bar 7.

Figure 2:
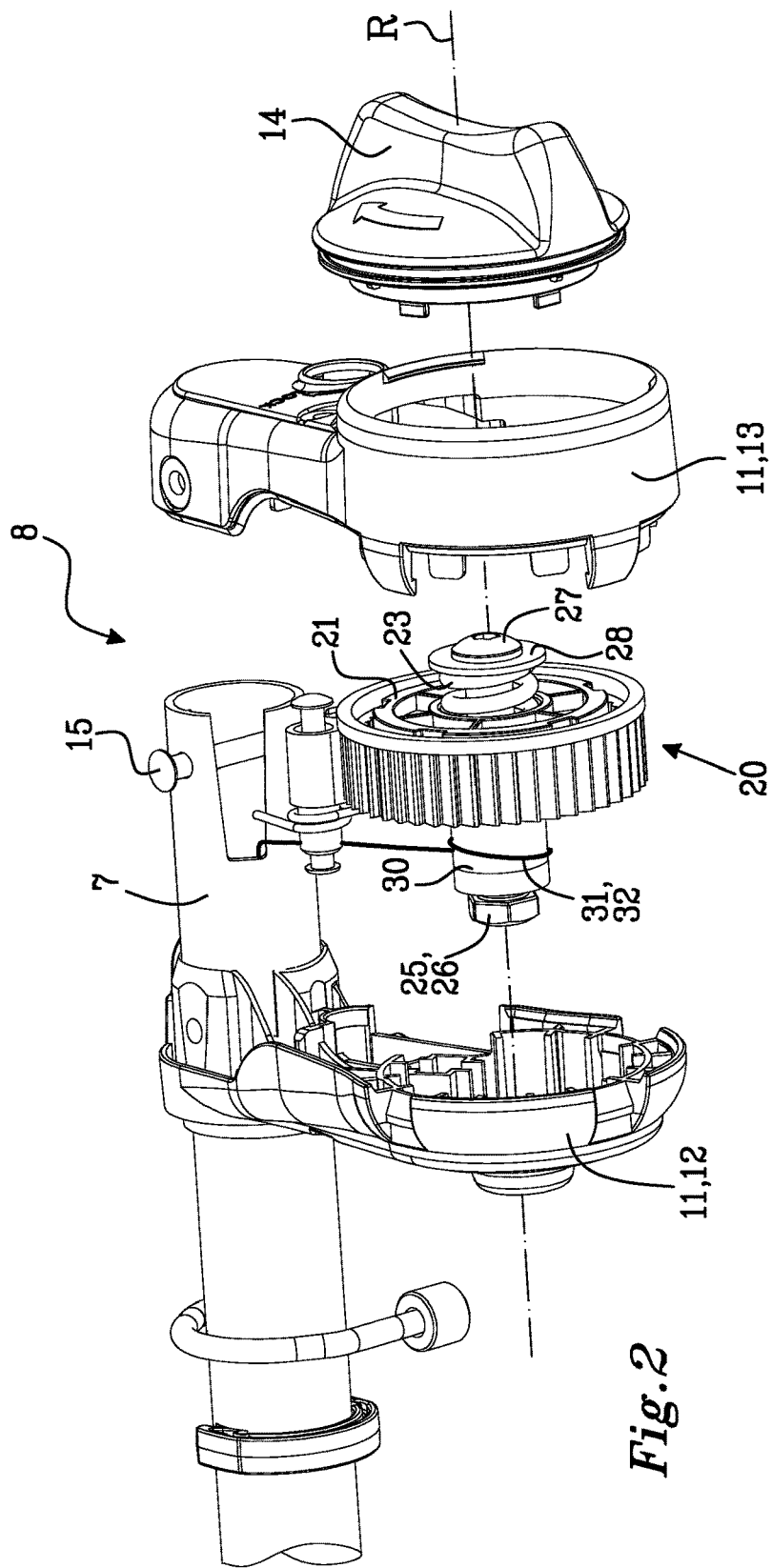
FIG. 2 shows the tensioning device for operating the clamping jaw of the bicycle support assembly.

FIG. 2 shows the tensioning device 10 in greater detail and with a partly exploded view. FIG. 2 shows parts of the support bar 7 and especially the first end 8 of the support bar 7. The tensioning device 10 comprises a housing 11 formed by a first and a second house section 12, 13. The housing 11, formed by the first and the second house sections 12, 13, is attached to the support bar 7 via a bolt 15.

The tensioning device 10 comprises a torque limiting mechanism 20. The torque limiting mechanism 20 is adapted to limit the amount of transferable torque which a user can impart to the tensioning device 10 and basically to the clamping jaw 3. By introducing a torque limiting mechanism, the risk of accidentally impart a bicycle with too much force is significantly reduced. It further makes the amount of wear and tear imparted to the elongated element far more predictable especially when the elongated element if a flexible elongated element that extends around corners in a support bar for example, or if it slides, chafes or scrapes against any surface in a support bar.

The torque limiting mechanism 20 is enclosed inside of the housing 11 which also functions as a support structure to the torque limiting mechanism 20. The rotatable knob 14 is adapted to cooperate with the torque limiting mechanism 20 to operate the tensioning device 10 to transfer torque via rotation of the rotatable knob 14.

FIG. 2 further shows a first and a second torque transmission member 21, 22. A resilient member 23 in this case a helical spring biases the first and the second torque transmission members 21, 22 together. A first screw 25 having a head 26 and a threaded aperture and the opposing end to the head 26 in which a second screw 27 is connected to. A washer 28 supports the resilient member 23 and braces it against the second screw 27 and its head. The first and the second torque transmission members 21, 22 are thus held together using the first and the second screws 25, 27 and biased using the resilient member 23. The first and the second torque transmission members 21, 22 are operating as gear wheels with intermeshing teeth and can also be referred to as the first and the second gear.

The second torque transmission member 22 comprises an axle 30. The axle 30 is formed in one unitary piece of material with the second torque transmission member 22 but could be formed by a separate piece of material and attached thereto, or arranged in working cooperation with the second torque transmission member 22. A flexible elongated element 31, in this case a wire 32, is wound about the axle 30. The wire 32 is connected to the second torque transmission member 22 so that when the second torque transmission member 22 is rotated in a clockwise direction the wire 32 is wound about the axle 30. When the axle 30 is rotated in a counter clockwise direction, the wire 32 is unwound from the axle 30, when positioned as shown in FIG. 1. The wire 32 extends from the axle 30 into the support bar 7 and is guided by the interior of the support bar 7 to the clamping jaw 3.

FIG. 2 further shows the rotation axis R of the axle 30. In this embodiment, the rotation axis R is aligned with the rotation axis of the knob 14, and the first and the second torque transmission members 21, 22.

The flexible elongated element 31 is displaced in a direction offset to the rotation axis R when the second torque transmission member 22 rotates. It can either tension the clamping jaw 3, or release the tension imparted to the clamping jaw 3. In FIG. 2, the flexible elongated element is translated, or displaced, substantially perpendicular to the rotation axis R. A suitable offset is from 10-170 degrees, preferably 45-135 degrees, more preferably from 70-110 degrees with respect to the rotational axis R of the second torque transmission member 22.

It should be noted that there are other ways in which torque can be transferred instead of a rotatable knob such as via a lever. Torque may be transferred manually, as in the shown embodiment, or automatically using an electrical motor. The activation member can be an electric switch in such case. It should also be noted that the rotatable knob 14 can be formed in one unitary piece of material with the first torque transmission member 21. The first torque transmission member can be provided with a protruding flange forming a handle for the user if desirable.

Figure 3:
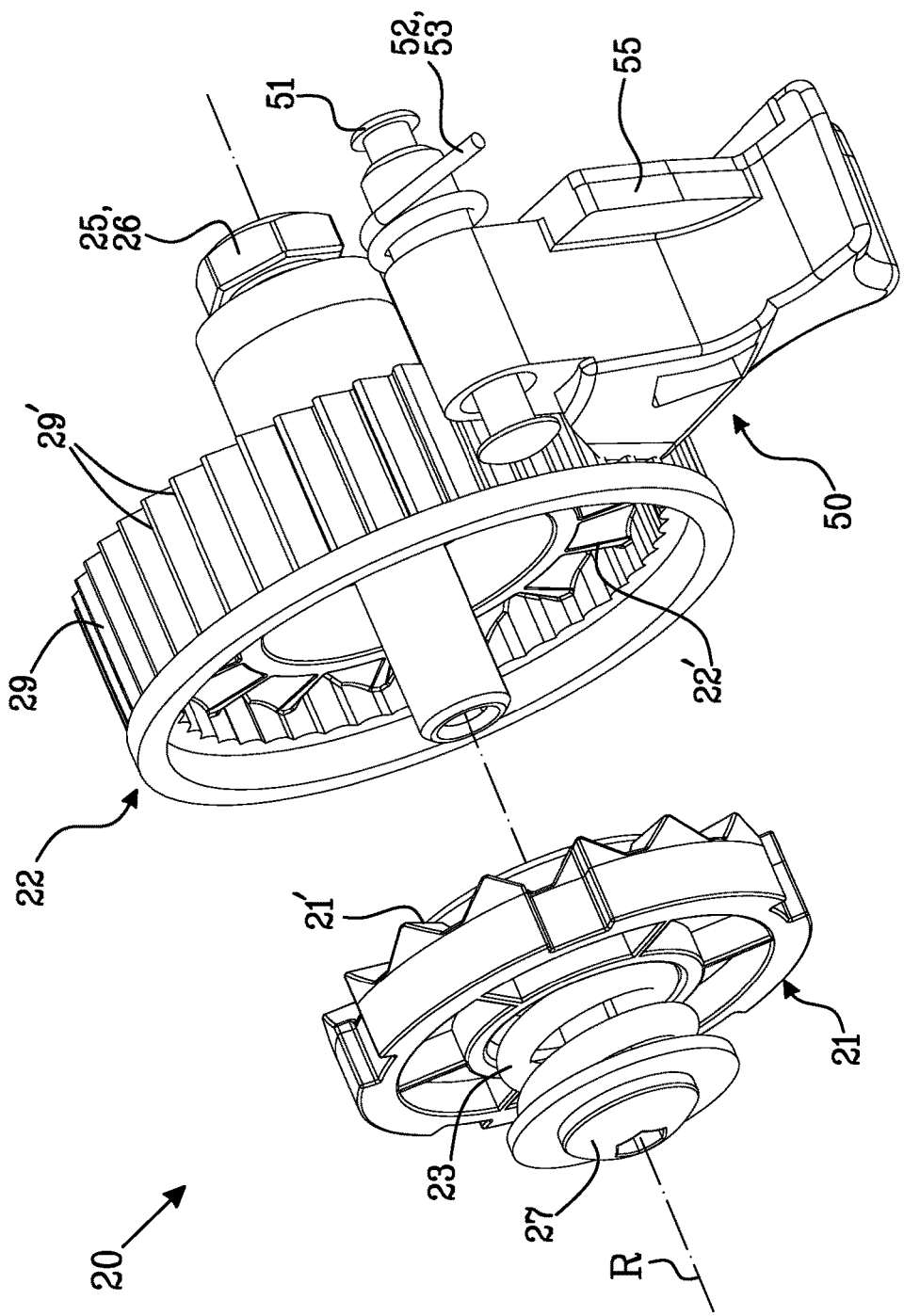
FIG. 3 shows torque limiting mechanism and the rotation lock of the tensioning device of FIG. 1.

FIG. 3 shows the torque limiting mechanism 20 in greater detail. FIG. 3 also shows a rotation lock 50. FIG. 3 shows the first and the second torque transmission member 21, 22, the resilient member 23 which biases the first and the second torque transmission members 21, 22 together. The first screw 25 with the head 26 and the threaded aperture, the second screw 27 and the washer 28.

The torque limiting mechanism 20 transfers torque through the interaction between the first and the second torque transmission members 21, 22. The first torque transmission member 21 comprises gear teeth 21' extending in a direction parallel with the rotational axis R. Each of the gear teeth 21' has angled surfaces. The first torque transmission member 21 is adapted to be in working cooperation with the second torque transmission member 22. The second torque transmission member 22 also comprises gear teeth 22' extending along in a direction parallel with the rotational axis R and having angled surfaces on each of the gear teeth 22'. As such the first and the second torque transmission members 21, 22 use the principle of crown gears. The gear teeth 21' of the first gear member 21 are adapted to interact with the gear teeth 22' of the second gear member 22 so as to transfer torque imparted by a user there between. However, if a threshold level of torque is reached the gear teeth 21', 22' will start to slip and eventually loose grip with each other. The threshold value of torque can be defined by the strength of the resilient member 23 and/or via the shape and form of the gear teeth 21', 22'. As the grip between the first and the second torque transmission members 21, 22 is lost, the first torque transmission member 21 will rotate with respect to the second torque transmission member 22 instead or rotating synchronous and thus prevent the rotating motion imparted by the user from being transferred between the first and the second torque transmission members 21, 22. In this manner an efficient and secure torque limiting mechanism is provided.

Figure 4:
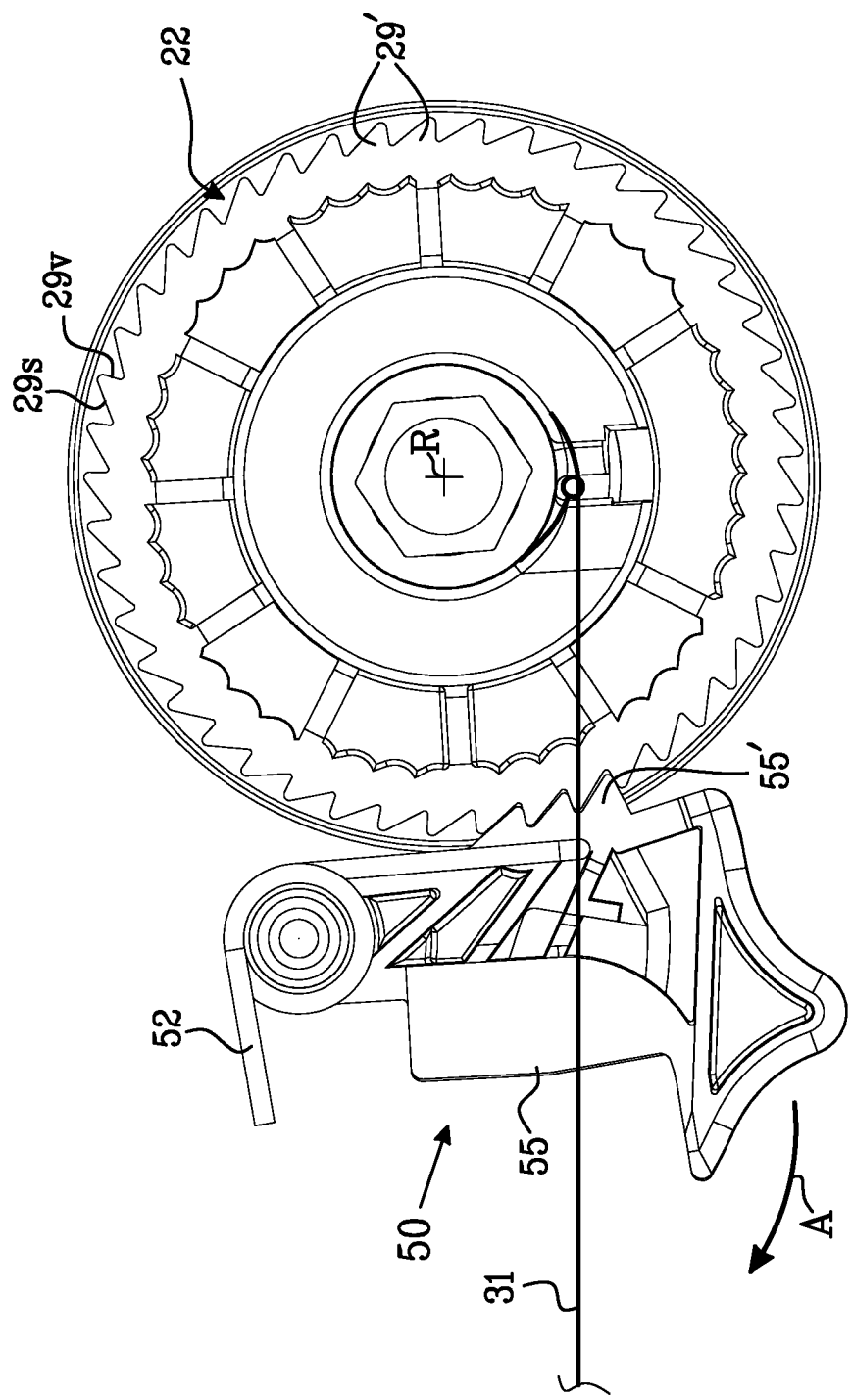
FIG. 4 shows torque limiting mechanism and the rotation lock of the tensioning device of FIG. 3 along a different view.

FIG. 4 shows the second torque transmission member 22 and the rotation lock 50 with a view along the rotation axis R. The second torque transmission member 22 comprises a peripheral rim 29 comprising lock teeth 29'. The lock teeth 29' are protruding elements having one sloping side, referred to as the slope side 29s, and one side extending substantially in the radial direction referred to as the radial side 29r. The radial sides 29r of the lock teeth 29' are adapted to cooperate with a rotation lock 50. The rotation lock 50 comprises a clasp 55 which is pivotally suspended via an axle 30 to the housing 11 and biased by a resilient member 52 into engagement with the lock teeth 29' of the second torque transmission member 22. The resilient member 52 is a helical spring 53 in the shown embodiment. The clasp 55 comprises cooperating teeth 55', in this case three teeth, although a suitable number of teeth can be from 1-10. The teeth 55' of the clasp 55 are adapted to engage the lock teeth 29' of the second torque transmission member 22 permitting the second torque transmission member 22 to be rotated in a counter clockwise direction, but preventing it from rotating in a clockwise direction, when positioned as shown in FIG. 4. The flexible elongated element 31, in this case the wire 32, is schematically illustrated in FIG. 4.

Figure 5:
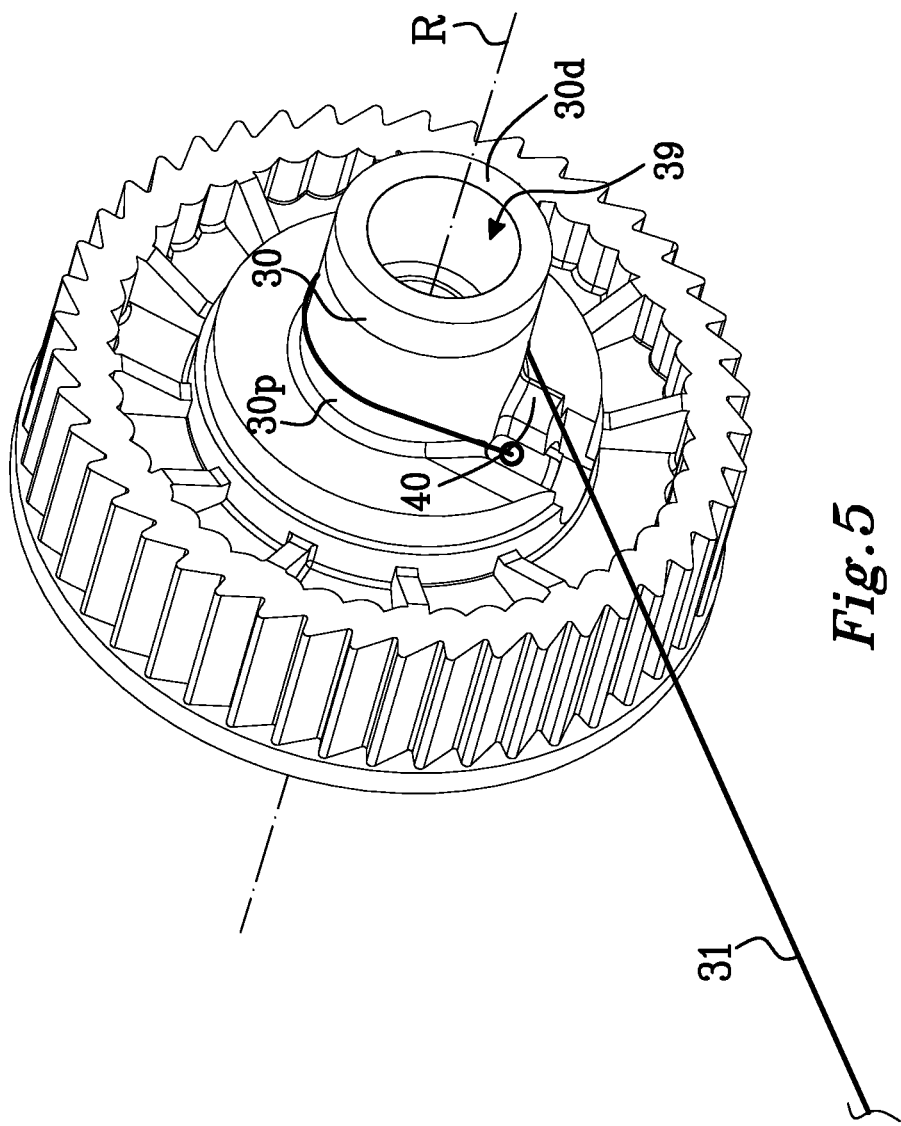
FIG. 5 shows the second torque transmission member in greater detail.

FIG. 5 shows the second torque transmission member 22 in greater detail. The axle 30 extends from the center of the second torque transmission member 22. In the center of the second torque transmission member 22 is an aperture 39 to receive the first screw 25 (not shown in FIG. 5). The elongated element 31, such as a wire, is also visible in FIG. 5. The axle 30 partly defines the aperture 39 as the aperture extends through the axle 30. The axle 30 has a proximal end 30p and a distal end 30d. The proximal end 30p of the axle 30 is in the shown embodiment formed in one unitary piece of material with the second torque transmission member 22, but could simply be connected thereto. As the second torque transmission member 22 is rotated via the intermeshing teeth of the first torque transmission member, the axle 30 is rotated enabling the flexible elongated element to be wound or unwound about the axle 30. FIG. 5 further shows the rotation axis R.

In the proximity of the proximal end 30p of the axle 30 is an aperture 40 extending through the second torque transmission member 22. A groove in the second torque transmission member can be used as an option to the aperture. The aperture 40 is adapted to receive and retain a first end of the flexible elongated element 31, in this case the wire 32, and secure it to the second torque transmission member 22. From the aperture 40, the flexible elongated element 31 can be wound about the axle 30 and extend into the support bar 7, as shown in FIG. 2 for example. It should be noted that the first end of the flexible elongated element 31 can be retained at other positions, such as in the housing 11 or on the axle 30 e.g. at the distal end 30d of the axle 30, if desirable. By positioning the aperture 40 in the proximity of the proximal end 30p of the axle 30, the axle itself is not used to form the aperture, and the void defined by the aperture 39 which is adapted to receive the first screw 25 is not compromised.

To retain a bicycle to the bicycle support assembly 1, a user positions the frame of the bicycle in the clamping jaw 3, i.e. between the first and the second jaw member 4, 5. The rotatable knob 14 is thereafter rotated to tension the clamping jaw 3 using the tensioning device 10. As the rotatable knob 14 is connected the torque limiting mechanism 20 via the first torque transmission member 21, torque can be transferred to the second torque transmission member 22 and the axle 30. When the user exceeds the torque threshold value, the torque limiting mechanism will disengage in terms of that the first torque transmission member 21 disengages from the second torque transmission member 22 and prevent further torque to be imparted. When the user wants to release the bicycle from the clamping jaw 3, the user push the clasp 55 in a direction away from the second torque transmission member 22, indicated with the arrow A in FIG. 4, whereby the imparted torque is immediately released as the second torque transmission member 22 freely rotates to unwound the wire 32. The clamping jaw 3 is automatically opened by the resilient member (not shown) which biases the second jaw member 5 away from the first jaw member 4.

Figure 6:
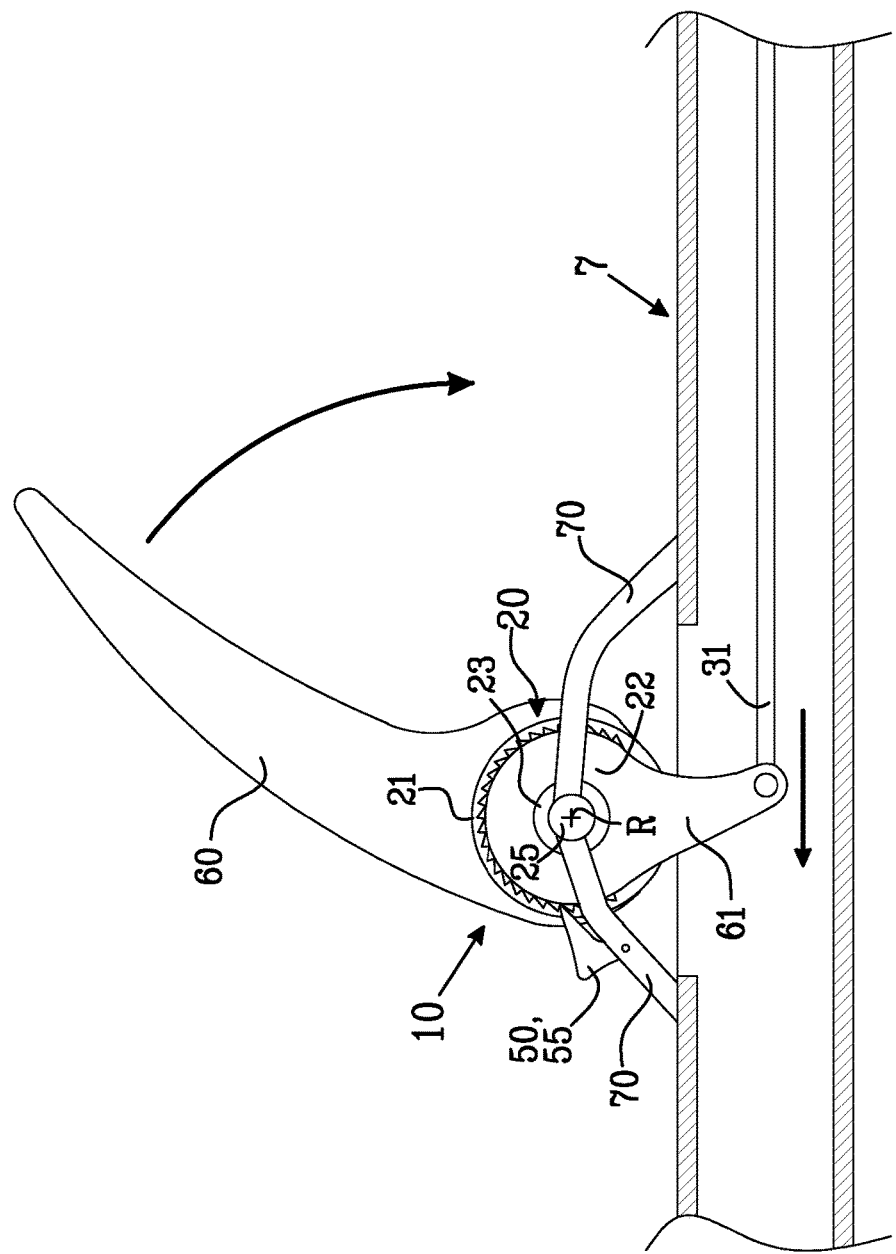
FIG. 6 shows a tensioning device which uses a pivotable lever to transfer torque between the first and the second torque transmission members to tighten the flexible elongated element.

FIG. 6 shows a tensioning device 10 having a pivotable lever instead of a rotatable knob. FIG. 6 shows a lever 60, a first torque transmission member 21, a second torque transmission member 22, a resilient member 23 in the form of a helical spring 23, screw 25, and the rotation axis R. Support legs 70 is used to position and attach the tensioning device 10 to a support bar 7. Connected to the second torque transmission member 22 is a flexible elongated element 31 which other end (not shown in FIG. 6) is connected to a load retaining mechanism such as a clamping jaw 3. It should be noted that the flexible elongated element 31 could be replaced by a rigid elongated element if suitable or dependent on the shape and form of the support bar 7. The second torque transmission member 22 has a protruding member 61 which extends into the interior of the support bar 7 and connects to the flexible elongated element 31. A torque limiting mechanism 20 as described above is used to provide the lever with a torque limiting function. The lever 60 can be formed in one unitary piece of material with the first transmission member 21, or be connected thereto as a separate member. The lever 60 can be provided with a mechanism which permits the lever 60 to be repeatedly pivoted upwards and downwards to tension the flexible elongated element 31. A rotation lock 50 with a clasp 55 as described above can be used to maintain the imparted tension by the lever 60. The flexible elongated element 31 can be connected to a clamping jaw, or any other suitable object which can be used to tighten a load such as a hook, ring or the like.

The tensioning device 10 can be positioned on the support bar 7, or at any different position such as inside of a roof box, on the lid of a roof box. When positioned on the lid of a roof box, the tensioning device 10 can be used as a tensioning device for locking the lid.

To retain a bicycle to the bicycle support assembly 1, a user positions the frame of the bicycle e.g. in a clamping jaw such as a clamping jaw 3 described herein which is used hereafter to describe the function. The frame of a bicycle is positioned between a first and a second jaw member. The pivotable lever 60 is thereafter pivoted downwards as indicated by the arrow in FIG. 6 to tension the clamping jaw 3 using the tensioning device 10. As the pivotable lever 60 is connected the torque limiting mechanism 20 via the first transmission member 21, torque can be transferred to the second torque transmission member 22 and thus translate the flexible elongated element 31 to tension the clamping jaw 3. When the user exceeds the torque threshold value, the torque limiting mechanism 20 will limit the amount of transferable torque in terms of that the first torque transmission member 21 will disengage from the second torque transmission member 22 and prevent further torque to be imparted. When the user wants to release the bicycle from the clamping jaw 3, the user push a clasp 55, with similar function and features as described above, in a direction away from the second torque transmission member 22, whereby the imparted torque is immediately released as the second torque transmission member 22 freely rotates to unwound the flexible elongated element 31. The clamping jaw 3 can be automatically opened by a resilient member (not shown) which biases the second jaw member away from the first jaw member. As is noticed, the flexible elongated element 31 is displaced substantially perpendicular to the rotation axis R of the second torque transmission member 22 when the lever 60 is moved downwards.

The described tensioning device 10 can be used with a roof box for a vehicle, e.g. to secure load inside of the roof box, to secure the lid, or to secure the roof box itself to a roof rack. The flexible elongated element can simply be provided with a hook at the distal end, instead of being arranged to a clamping jaw. The torque limiting mechanism can also function as a torque indicator by means of the click sound which rises when a user exceeds the threshold value and the gear teeth 21' of the first torque transmission member 21 slips against the gear teeth 22' of the second torque transmission member 22.

Figure 7:
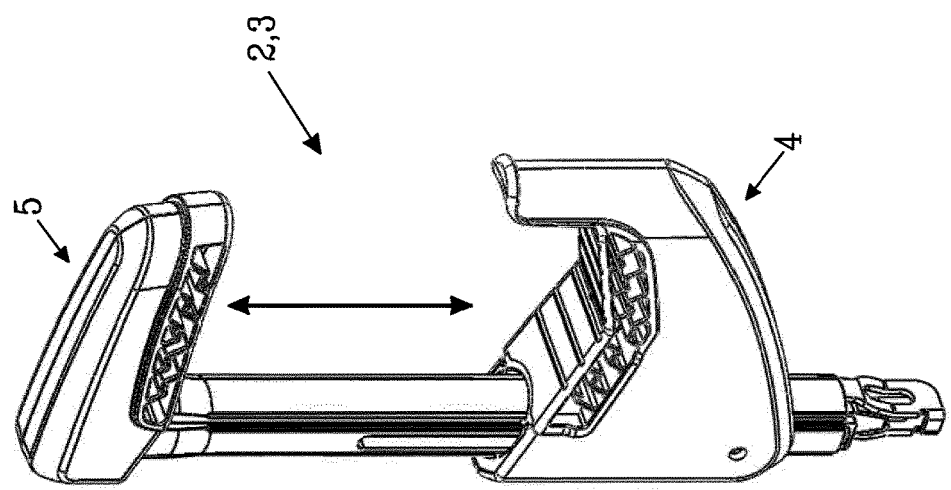
FIG. 7 shows a clamping jaw suitable to use with a bicycle support assembly described herein.

FIG. 7 shows a load retaining mechanism 2 in the form of a clamping jaw 3 having a first and a second jaw member 4, 5. Just as described above, the distance between the first and the second jaw members 4, 5 can be adjusted, or operated, via a tensioning device, such as the tensioning device described with reference to FIGS. 1-6. It is possible however that the load retaining mechanism 2, and the clamping jaw 3, can be operated by other tensioning devices but is preferably operated by a tensioning device having a torque limiting function. A resilient member (not shown) in the form of a helical spring for example, can be arranged to bias the second jaw member 5 away from the first jaw member 4. Just like described above with reference to FIGS. 1-6, the tensioning device can operate the clamping jaw 3 via an elongated element (not shown) preferably a flexible elongated element and be arranged on a support bar 7 and an attachment module as shown in FIG. 1 for example. It can further be operated as described above, e.g. using a flexible elongated element such as a wire, a cord, a strap, a chain or the like.

The first and the second jaw members 4, 5, can be connected and operated in different ways. One way of operating the clamping jaw 3 is by using a translational motion as shown in FIG. 7 indicated by the arrow, or if the first and the second jaws are pivotally connected, by a pivot motion.

The clamping jaw 3 can be arranged at an outer end of the support arm 7, shown in FIG. 1. Each jaw member 4, 5, comprises a bicycle facing surface so that a first bicycle facing surface of the first jaw member is facing said a second bicycle facing surface of the second jaw member. The second jaw member is moveable with respect to the second jaw member to enable a clamping force between the first and the second jaw member to retain a bicycle there between. The second jaw member can further be moveably arranged with respect to the first jaw member and the support arm.

Figure 8B:
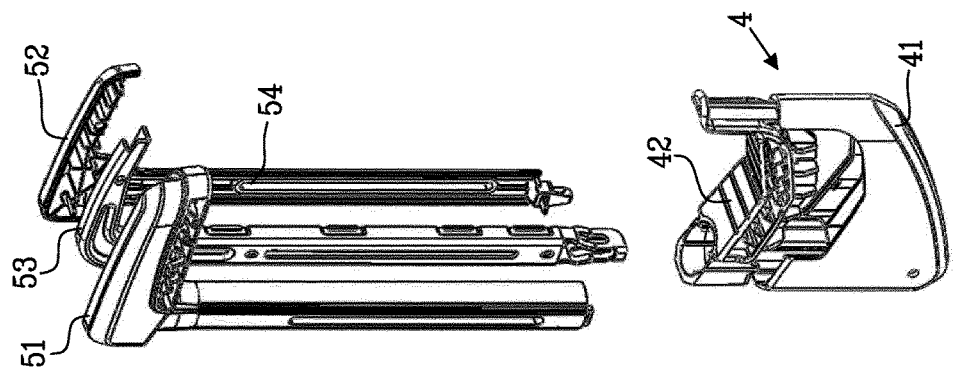
FIG. 8*a*-8*b* shows the clamping jaw of FIG. 7 in exploded view.
Figure 8A:
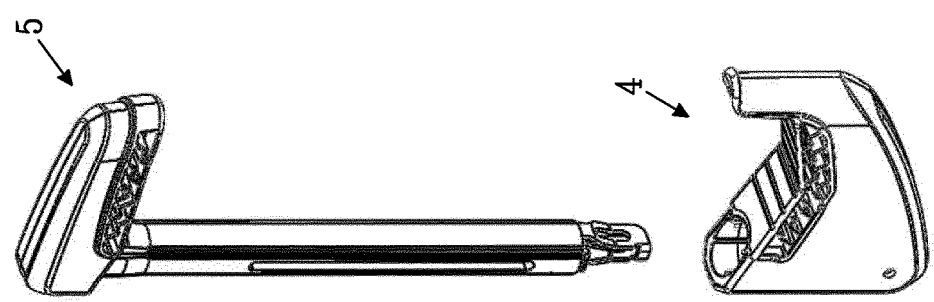

FIGS. 8a-8b show the clamping jaw 3 shown in FIG. 7 with an exploded view. It should be noted that the clamping jaw 3 can be manufactured in a wide variety of ways within the boundaries of the present invention, hereinafter is one embedment described. FIGS. 8a-8b show the first jaw member 4 comprising a jaw member shell 41 and a resilient pad 42. The second jaw member 5 comprises a second jaw member shell 51, 52 formed by two opposing parts connectable about an inner jaw member 53. A resilient pad 54 is also shown. Each jaw member 4, 5 will be described in greater detail below.

Figure 9F:
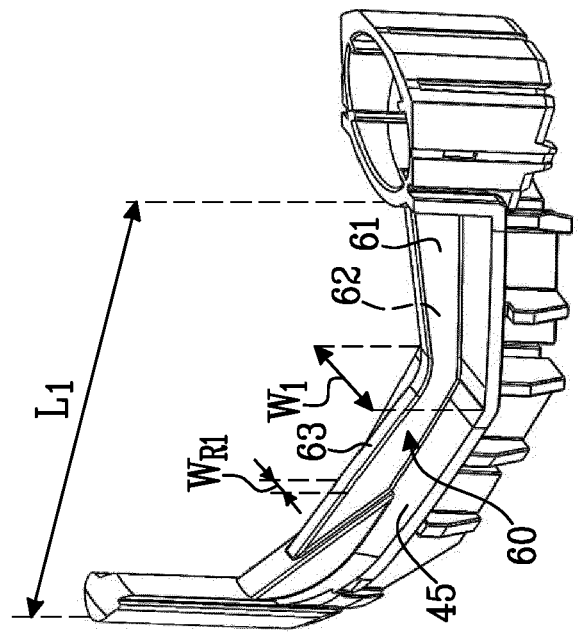
Figure 9E:
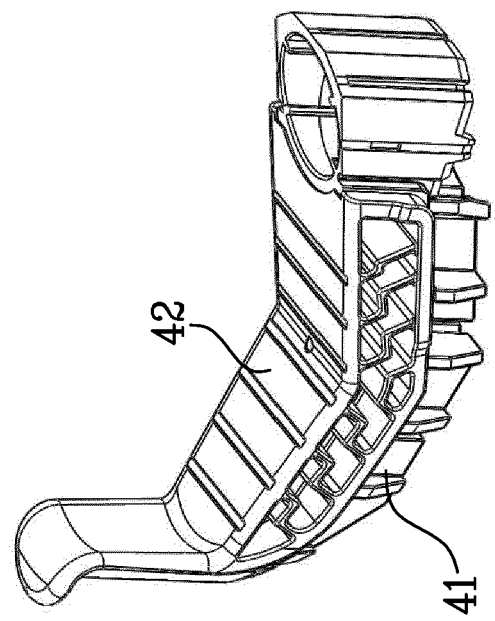

Reference will be made to FIGS. 9a-9f simultaneously below. FIGS. 9a-9d show a side view of the first jaw member 4 in which FIGS. 9a and 9c show the first jaw member 4 with the resilient pad 42, and FIGS. 9b and 9d show the jaw member 4 without the resilient pad 42. FIGS. 9e-9f shows the first jaw member 4 partly with a cross sectional view and with a perspective view showing the first jaw member 4. FIG. 9e shows the resilient pad 42 and FIG. 9f shows the first jaw member 4 without the resilient pad 42.

Turning to FIG. 9f, the first jaw member 4 has bicycle facing surface 45. The bicycle facing side 45 is intended to face the connected frame of the bicycle after the clamping jaw 3 is connected thereto with the intention to retain the bicycle. As is noticeable, the jaw member 4 comprises a ridge 60 extending along the length L1 of the first jaw member 4. The ridge 60 is also shown in FIG. 9b and partly in FIG. 9a. The length L1 and a width W1 of the first jaw member 4 are indicated in FIGS. 9b and 9f with reference L1 and W1 respectively.

The ridge 60, which in the shown embodiment can be arranged on the first and/or the second jaw member 4, 5, but in the described embodiment, is arranged on both the first and the second jaw members 4, 5, provide smaller contact point with the frame of the bicycle. It is believed that with a smaller contact point with the frame of the bicycle, the bicycle is less sensitive to misalignment of the clamping jaw 3 and the first and the second jaw members 4, 5. Disadvantages derived from angle misalignments of the frame of the bicycle can thus be eliminated or at least reduced. As shown in FIG. 9f, the ridge 60 has a width WR1. The width WR1 of the ridge 60 is as can be noticed smaller than the width of the bicycle facing surface 45 of the first jaw member 4.

In an embodiment, the width WR1 of the ridge 60 is 50% or smaller than the width W1 of the bicycle facing surface 45, preferably the width WR1 of the ridge 60 is 35% or smaller than the width W1 of the bicycle facing surface 45, even more preferably the width WR1 of the ridge 60 is 20% or smaller than the width W1 of the bicycle facing surface 45. As is understandable, the width WR1 of the ridge 60 of the first jaw member 4 cannot be too thin, hence it is deemed that a minimum width WR1 of the ridge 60 of the first jaw member 4 is at least 1%, preferably at least 2%, even more preferably at least 3% of the width W1 of the first jaw member 4. It is important that respective width is measured at corresponding positions, as this will take into account that the jaw member may have a different width long the length of the jaw member.

The ridge 60 in the shown embodiment extends substantially along substantially the full length of the first jaw member 4. In an embodiment, the ridge 60 extends at least along that portion of the bicycle facing surface 45 and the first jaw member 4 which is adapted to receive the frame of the bicycle.

The ridge 60 protrudes from the bicycle facing surface 45 of the first jaw member in a direction towards the bicycle facing surface of the opposing second jaw member (shown in FIG. 7 for example). In embodiments were both the first and the second jaw members 4, 5 has a ridge 60, the ridges 60 of the first and the second jaw members 4, 5 are aligned in a vertical plane so that they can be positioned on opposing sides about the frame of a bicycle.

Figure 10B:
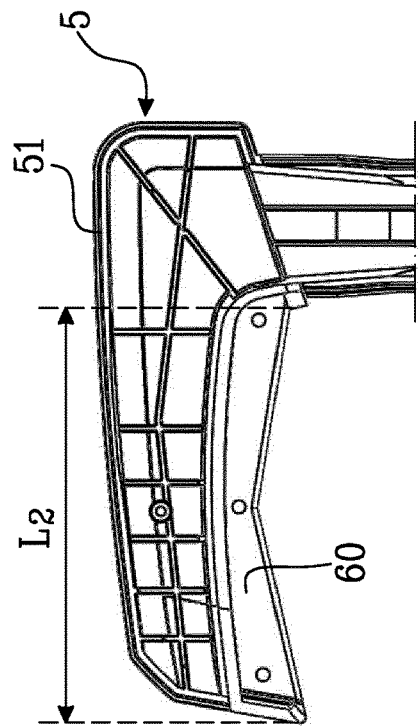
FIGS. 10*a*-10*f* show different views of the second jaw member of the clamping jaw of FIG. 7.
Figure 10D:
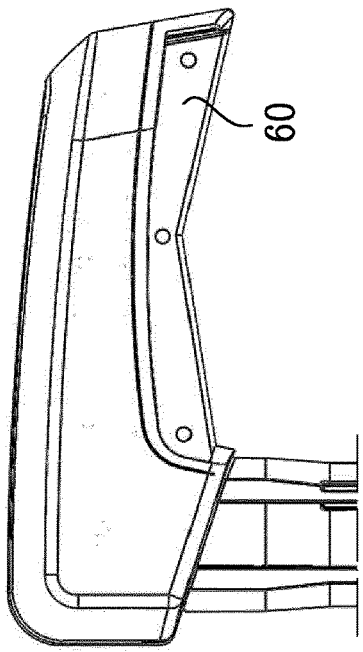
Figure 10A:
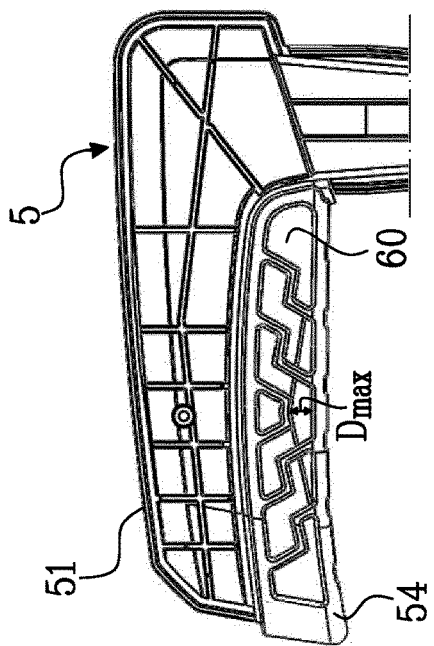
Figure 10C:
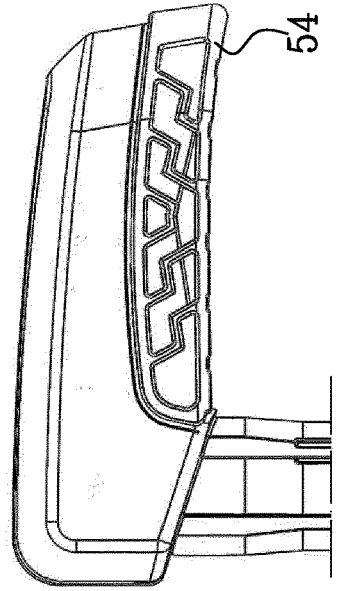
Figure 10F:
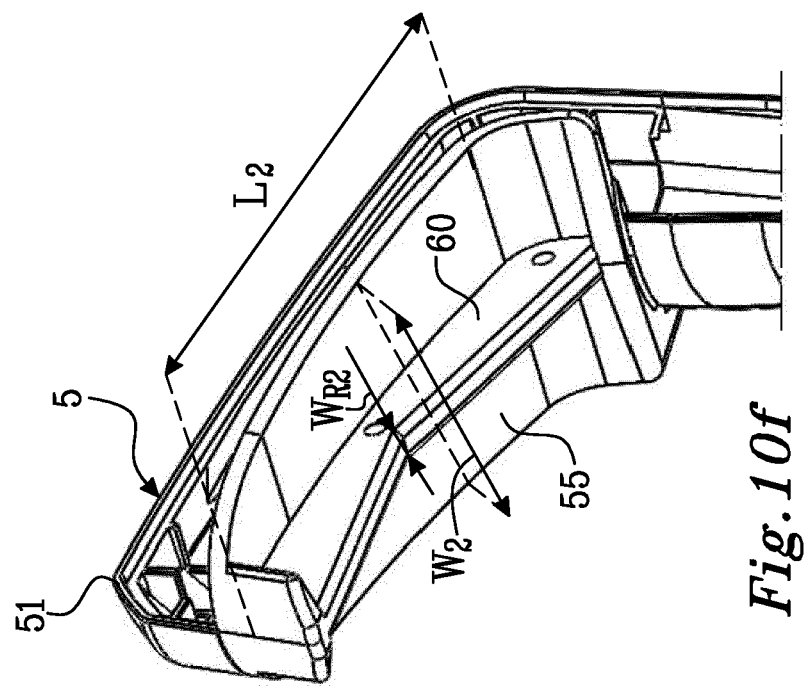

The ridge extends along the centre, and is positioned along a centre line of each jaw members 4, 5 as can be seen in FIGS. 9 and 10f.

The form of the ridge 60 can be different. It is conceivable that the ridge 60 of the first jaw member 4 has a different or substantially similar form, or identical form as compared to the form of the ridge 60 of the second jaw member 5. In the shown embodiment in FIGS. 9a-9f and 10a-10f, the ridge 60 has a substantially V-shaped form when viewed as shown in FIGS. 9b and 10b. It is believed that the substantially V-shaped form assists in positioning the frame of the bicycle in a favorable position in an easy manner between the first and the second jaw members 4, 5. Other forms of the ridges are however plausible such as a substantially U-shaped form, flat forms and the like.

The cross section of the ridge 60, when viewed along the length of et ridge 60, can have different forms but is preferably simply substantially rectangular, i.e. two parallel side walls 61, 62 and a top surface 63 substantially perpendicular to the two parallel side walls 61, 62.

Figure 10E:
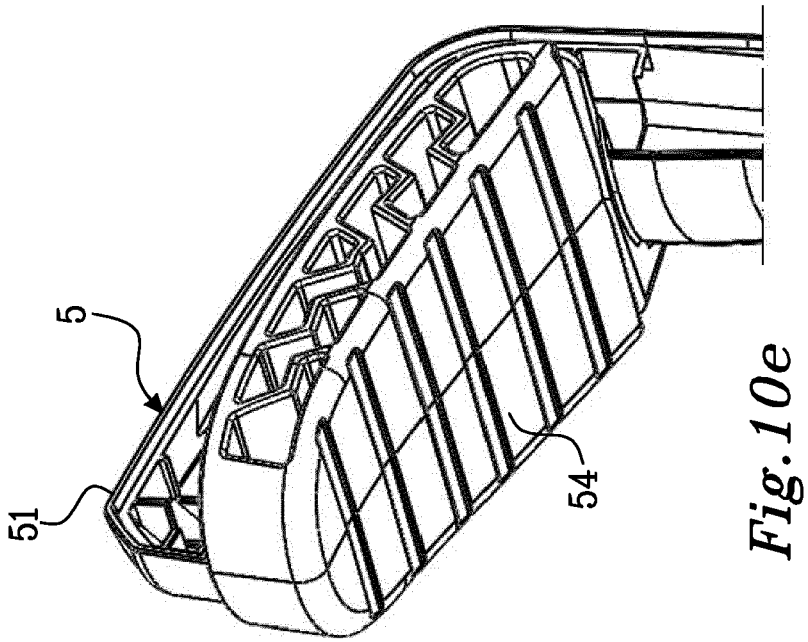

Reference will now be made to FIGS. 10a-10f simultaneously below. FIGS. 10a-10b show a cross sectional view of the second jaw ember 5 in which FIG. 10a shows the second jaw member 5 with the resilient pad 54, and FIG. 10b shows the jaw member without the resilient pad 54. FIGS. 10a-10b further show the second jaw member shell 51. FIGS. 10a-10d show the opposing side of the FIGS. 10a-10b. FIG. 10e shows the second jag member 5 with a perspective view showing the second jaw member 5 comprising the jaw member shell 51 and FIG. 10f shows the second jaw member 5 partly with a cross sectional view. FIG. 10e further shows the resilient pad 54 and FIG. 10f shows the jaw member 5 without the resilient pad 54.

Turning to FIG. 10f, the second jaw member 5 has bicycle facing surface 55. The bicycle facing side 55 is intended to face the connected frame of the bicycle after the clamping jaw 3 is connected thereto with the intention to retain the bicycle. As is noticeable, the jaw member 5 comprises a ridge 60 extending along the length L2 of the second jaw member 5. The ridge 60 is also clearly shown in FIG. 10b and partly in FIG. 10d. The length L2 and a width W2 of the second jaw member 5 are indicated in FIGS. 10b and 10f with reference L2 and W2 respectively.

The first and/or the second jaw member 4, 5 can be provided with a resilient pad 42, 54. In the shown embodiment of FIGS. 9a-10f, the resilient pad 42, 54 is intended to provide a softer more lenient material adjacent to the frame of the bicycle while the jaw member itself 4, 5 provide the desired structural integrity and the ridge 60 the load carrying contact. The resilient pads 42, 54 are lenient towards the frame but should not be too lenient. It has been found that a minimum measure of resiliency is desired. This measure can be expressed, or described, as a function of the deformation imparted to the resilient pad when being subjected to a predetermined force. The resilient pad can have a maximum deformation distance Dmax, indicated in FIGS. 9a and 10a, and a zero deformation distance D0 defined by no deformation at all of the resilient pad, i.e. the relaxed state of the resilient pad. The amount of force required to compress the resilient pad to reach the maximum deformation distance Dmax is a very good indication of just how much counter force the resilient pad is subjecting the frame of the bicycle with.

In an embodiment, the maximum deformation distance Dmax is reached by the deforming the resilient pad by a force corresponding to 7 Nm. Optionally the force can be 5-15 Nm, preferably 6-12 Nm, more preferably 6-9 Nm.

As mentioned above, the bicycle support assembly can be operated via a tensioning device. The tensioning device can comprise a torque limiting mechanism adapted to limit the amount of transferable torque. In practice, this means that a frame of a bicycle can only be subjected to a predetermined maximum compression force imparted by the clamping jaw. The limit of transferable torque is advantageously adapted to correspond to a preselected force, preferably substantially corresponding to 5-15 Nm, preferably 6-12 Nm, more preferably 6-9 Nm, most preferred to about 7 Nm.

The limit transferable torque of the torque limiting mechanism and the corresponding preselected force preferably substantially corresponds to the preselected force of the resilient pad, i.e. the amount of force required to compress the resilient pad to reach the maximum deformation distance Dmax.

The specific resiliency of the resilient pad can be achieved in a wide variety of ways. For example, it can be achieved by structural means or by the selection of a specific material. The resilient pad can be made from at least one material selected from the list of; polyethylene, polypropylene, polyureathane or combinations thereof. The resilient pad can made from a homogeneous piece of material or from combinations of materials. It can optionally or additionally be made from a foam material.

The resilient pad can be attached to the respective jaw member by adhesive, such as a hot melt adhesive for example.

One measure of the compression force required to compress the resilient pad, i.e. to reach the maximum deformation distance Dmax, can simply be determined by studying the deformation when torque is applied.

The invention claimed is:

1. A tensioning device for a load carrier, comprising:
a torque limiting mechanism adapted to limit the amount of transferable torque, said torque limiting mechanism comprising:
a first torque transmission member and a second torque transmission member,
wherein said first torque transmission member is biased into axial working cooperation with said second torque transmission member,
wherein upon a torque threshold value, said first transmission member and said second torque transmission member are disengaged from said working cooperation so that a torque limiting function is provided; and
an activation member associated with said first torque transmission member adapted to operate said first torque transmission member to transfer torque to said second torque transmission member,
wherein said second torque transmission member has a rotation axis and is connected to an elongated element, wherein upon rotation of said second torque transmission member, said elongated element is displaced in a direction offset to said rotation axis.

2. The tensioning device according to claim 1, wherein said elongated element is displaced in a direction substantially perpendicular to said rotation axis of said second torque transmission member.

3. The tensioning device according to claim 1, wherein said elongated element is a flexible elongated element adapted to be tensioned upon rotation of said second torque transmission member.

4. The tensioning device according to claim 3, wherein upon rotation of said second torque transmission member, said flexible elongated element is wound or unwound about an axle having a rotation axis.

5. The tensioning device according to claim 4, wherein said second torque transmission member comprises said axle, wherein said flexible elongated element is adapted to be wound or unwound about said axle, wherein said axle is formed by a separate piece of material with respect to said second torque transmission member.

6. The tensioning device according to claim 1, wherein said first torque transmission member is a first gear and said second torque transmission member is a second gear.

7. The tensioning device according to claim 1, wherein said first torque transmission member is biased towards said second torque transmission member in a direction substantially perpendicular to said rotation axis.

8. The tensioning device according to claim 1, wherein said elongated element comprises a first end and a second end, wherein said first end is attached to said second torque transmission member.

9. The tensioning device according to claim 1, wherein said elongated element comprises a first end and a second end, wherein said second end is connected to a load retaining mechanism.

10. The tensioning device according to claim 1, wherein said activation member is a rotatable knob adapted for manual operation of said first torque transmission member or an electric switch adapted for automatic operation of said first torque transmission member.

11. The tensioning device according to claim 4, wherein said tensioning device comprises a rotation lock, wherein said rotation lock is adapted to prevent said axle or said second torque transmission member from rotation.

12. The tensioning device according to claim 11, wherein said rotation lock comprises a clasp adapted to engage said second torque transmission member to prevent said second torque transmission member from rotation.

13. A bicycle support assembly for a bicycle carrier, comprising:
a tensioning device, comprising:
a torque limiting mechanism adapted to limit the amount of transferable torque, said torque limiting mechanism comprising:
a first torque transmission member and a second torque transmission member,
wherein said first torque transmission member is biased into axial working cooperation with said second torque transmission member,
wherein upon a torque threshold value, said first transmission member and said second torque transmission member are disengaged from said working cooperation so that a torque limiting function is provided; and
an activation member associated with said first torque transmission member adapted to operate said first torque transmission member to transfer torque to said second torque transmission member,
wherein said second torque transmission member has a rotation axis and is connected to an elongated element, wherein upon rotation of said second torque transmission member, said elongated element is displaced in a direction offset to said rotation axis; and
a support bar,
wherein said elongated element extends inside or outside of said support bar and is connected to a load retaining mechanism, wherein said tensioning device is adapted to tension said load retaining mechanism via said elongated element.

14. A load carrier adapted to be attached to a vehicle, comprising:
a tensioning device, comprising:
a torque limiting mechanism adapted to limit the amount of transferable torque, said torque limiting mechanism comprising:
a first torque transmission member and a second torque transmission member,
wherein said first torque transmission member is biased into axial working cooperation with said second torque transmission member,
wherein upon a torque threshold value, said first transmission member and said second torque transmission member are disengaged from said working cooperation so that a torque limiting function is provided; and
an activation member associated with said first torque transmission member adapted to operate said first torque transmission member to transfer torque to said second torque transmission member,
wherein said second torque transmission member has a rotation axis and is connected to an elongated element, wherein upon rotation of said second torque transmission member, said elongated element is displaced in a direction offset to said rotation axis.

15. The load carrier according to claim 14, wherein said load carrier is a bicycle carrier comprising a wheel tray adapted to receive a wheel of a bicycle, wherein said tensioning device is arranged on said wheel tray.

16. A bicycle support assembly for retaining a bicycle in a bicycle carrier arrangement on a transporting vehicle, said bicycle support assembly comprising:
an elongated supporting arm extending in a longitudinal direction of said bicycle support assembly;
a clamping jaw arranged substantially at an outer end of said supporting arm, said clamping jaw comprising:
a first jaw member comprising a first bicycle facing surface and being connected to said supporting arm, and
a second jaw member comprising a second bicycle facing surface, said second bicycle facing surface facing said first bicycle facing surface,
wherein at least one of said first and second jaw members is movable with respect to said supporting arm such that a clamping force can be provided therebetween to retain said bicycle between said first and said second jaw members,
wherein said first bicycle facing surface of said first jaw member has a length extending in a longitudinal direction of said first bicycle facing surface and a width extending in a transverse direction of said first bicycle facing surface,
wherein said first bicycle facing surface of said first jaw member comprises a first ridge protruding from said first bicycle facing surface of said first jaw member, said first ridge extending along said length of said first bicycle facing surface of said first jaw member, and wherein said first ridge has a width, said width of said first ridge being smaller than said width of said first bicycle facing surface of said first jaw member.

17. The bicycle support assembly according to claim 16, wherein said second bicycle facing surface has a length and a width, wherein said second bicycle facing surface of said second jaw member comprises a second ridge protruding from said second bicycle facing surface of said second jaw member, said second ridge extending along said length of said second bicycle facing surface of said second jaw member, and wherein said second ridge has a width, said width of said second ridge being smaller than said width of said second bicycle facing surface of second first jaw member.

18. The bicycle support assembly according to claim 17, wherein said first or said second ridge is provided with a resilient pad, said resilient pad having a maximum deformation distance and a zero deformation distance.

19. The bicycle support assembly according to claim 18, wherein said maximum deformation distance is reached by deforming said resilient pad by a preselected force corresponding to 7 Nm.

20. The bicycle support assembly according to claim 18, wherein said resilient pad has a width, wherein said width of said resilient pad is larger than said width of said first or said second ridge and equal to or smaller than said width of said first or said second bicycle facing surface of said first or said second jaw member.

21. The bicycle support assembly according to claim 18, wherein said resilient pad is made from at least one material selected from the list of: polyethylene, polypropylene, polyureathane or combinations thereof.

22. The bicycle support assembly according to claim 19, wherein said bicycle support assembly is adapted to operate via a tensioning device, said tensioning device comprising a torque limiting mechanism adapted to limit the amount of transferable torque.

23. The bicycle support assembly according to claim 22, wherein said limit of transferable torque of said torque limiting mechanism substantially corresponds to said preselected force of said resilient pad.

24. A bicycle support assembly for retaining a bicycle in a bicycle carrier arrangement on a transporting vehicle, said bicycle support assembly comprising:

an elongated supporting arm extending in a longitudinal direction of said bicycle support assembly;

a clamping jaw arranged substantially at an outer end of said supporting arm, said clamping jaw comprising:

a first jaw member comprising a first bicycle facing surface and being connected to said supporting arm, and a second jaw member comprising a second bicycle facing surface, said second bicycle facing surface facing said first bicycle facing surface, wherein at least one of said first and second jaw members is movable with respect to said supporting arm such that a clamping force can be provided therebetween to retain said bicycle between said first and said second jaw members, wherein said first bicycle facing surface of said first jaw member has a length and a width, wherein said first bicycle facing surface of said first jaw member comprises a first ridge protruding from said first bicycle facing surface of said first jaw member, said first ridge extending along said length of said first bicycle facing surface of said first jaw member, wherein said first ridge has a width, said width of said first ridge being smaller than said width of said first bicycle facing surface of said first jaw member, wherein said first or said second ridge is provided with a resilient pad, and wherein said resilient pad has a width, wherein said width of said resilient pad is larger than said width of said first or said second ridge.

25. The bicycle support assembly according to claim 24, wherein said width of said resilient pad is equal to or smaller than said width of said first or said second bicycle facing surface of said first or said second jaw member.

* * * * *